A. A. HART.
HOSE COUPLING.
APPLICATION FILED OCT. 15, 1918.
1,339,620.
Patented May 11, 1920.
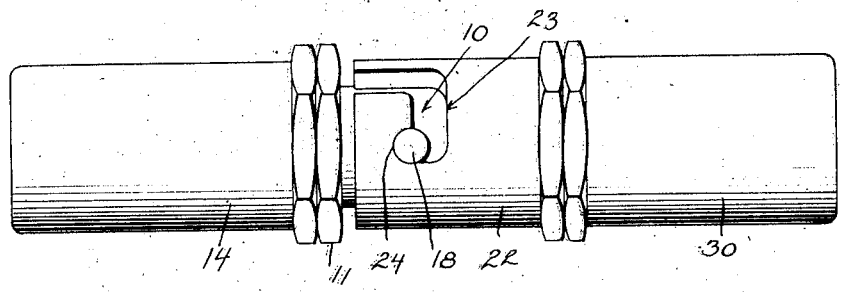
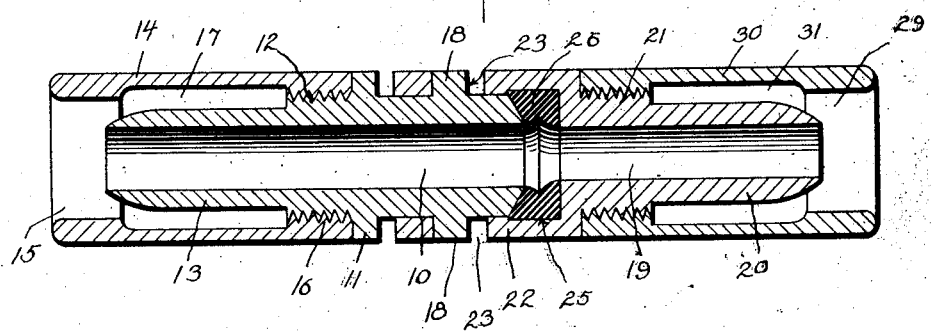
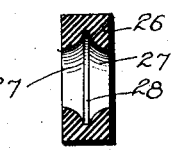
WITNESSES
RN Jones
Ross J Woodward.
INVENTOR
Albert A. Hart
BY Richard Bowen.
ATTORNEY

UNITED STATES PATENT OFFICE.

ALBERT A. HART, OF RICHMOND, CALIFORNIA.

HOSE-COUPLING.

1,339,620.  Specification of Letters Patent.  Patented May 11, 1920.

Application filed October 15, 1918. Serial No. 258,285.

*To all whom it may concern:*

Be it known that I, ALBERT A. HART, a citizen of the United States, residing at Richmond, in the county of Contra Costa and State of California, have invented certain new and useful Improvements in Hose-Couplings, of which the following is a specification.

This invention relates to an improved hose coupler and the principal object of the invention is to provide a coupler for connecting two sections of a hose, the coupler being so constructed that a very firm grip will be obtained upon the hose and the hose prevented from slipping out of engagement with the coupler when exposed to great pressure such as would be received in connection with a hose carrying compressed air.

Another object of the invention is to provide a coupler so constructed that the two sections of the coupler may be easily and quickly connected with the two hose sections and the two sections of the coupler then securely connected, provision being made for an air-tight joint between the two sections of the coupler.

Another object of the invention is to provide an improved type of gasket between the two sections of the coupler.

This invention is illustrated in the accompanying drawings, wherein:—

Figure 1 is a view showing the improved coupler in side elevation.

Fig. 2 is a longitudinal sectional view through the improved coupler.

Fig. 3 is a view showing the improved washer or gasket in section.

This coupler comprises two sections, one of which includes a tubular body 10 provided intermediate its length with an abutment shoulder or collar 11 and threaded as shown at 12 at the rear of said shoulder and having its rear end 13 reduced and tapered as shown in Fig. 2, thus providing a wedge for spreading the end portion of a hose positioned within the sleeve 14 now to be described. This sleeve 14 is provided at one end with a reduced mouth and at its other end with a thickened internally threaded shoulder 16 with a chamber 17 located between the mouth 15 and shoulder 16. One end of a hose section to be connected will be passed through the mouth 15 into the sleeve 14 and the sleeve then screwed upon the threaded portion 12 of the body 10 with the tubular wedge 13 fitting into the hose and spreading it within the chamber 17. It should be noted that the wedge extends into the mouth 15 thus tightly clamping the hose between the inner end of the wedge and the walls of the mouth. The front end of body 10 is beveled as shown in Fig. 2 and adjacent this end on the outer face of said body are provided pins 18 which radiate therefrom and are designed for a purpose to be described.

The second section of this coupler is provided with a tubular body 19 having its inner end 20 tapered to provide a wedge similar to the wedge 13 and thickened intermediate its length and threaded to provide a threaded shoulder 21 positioned at the rear of a head or cup 22 formed on its front end. This head or cup 22 is provided with bayonet slots 23 to receive the pins 18, the slots being provided at their inner ends with pockets 24 into which the pins will fit as shown in Fig. 1 when the two sections of the coupler are connected. The cup 22 is cut as shown in Fig. 2 to provide a seat 25 for the gasket 26 which gasket is formed of compressible material such as rubber and provided with thickened end portions 27, the thickened end portion terminating in spaced relation as shown at 28 thus permitting the thickened end portion to be compressed and brought together as shown in Fig. 2 to provide a very tight joint thus preventing leakage. The end portion of the second section of the hose will be passed through the constricted neck 29 of the sleeve 30 and will fit into the chamber 31 thereof and when this sleeve is screwed upon the threaded shoulder 21 of the tubular body 19, the wedge 20 of this section will fit into the hose and tightly secure the hose within the sleeve in the same manner as the hose section will be secured within the sleeve 14. It will thus be seen that when it is desired to connect two sections of a hose, one of the sections of the coupler will be connected with one section of the hose and the second section of the coupler will be connected with the second section of the hose. The two sections of the coupler will then be connected as shown in Figs. 1 and 2 thus providing a very tight and secure joint which however will be so constructed that the two sections of the coupler can be separated thus releasing the two hose sections without it being necessary to disconnect the sections of the coupler from the sections of the hose with which they are connected.

What is claimed is:—

A hose coupling of the class described comprising two sections, one of which includes a tubular body provided intermediately its length with an abutment shoulder and exteriorly threaded at the rear of said shoulder with its rear end reduced and tapered to provide a spreading wedge, the front end of said body being beveled and having laterally extending pins between said end and said shoulder, a sleeve encompassing said body in rear of said shoulder, and having a thickened interiorly threaded shoulder at one end for engagement with the threads of said body, said sleeve being interiorly thickened at its other end to form a reduced mouth, opening beyond the rear end of said body, the inner end of said mouth being disposed opposite the tapered end of said body; the other section comprising a tubular body with a tapered wedge at its rear end, and thickened intermediately its ends on its outer face, said thickened portion being threaded, a sleeve encompassing the rear end of said section and threaded interiorly to engage said thickened portion, said last mentioned section having a cup-shaped head at its front end equipped with bayonet slots to receive the pins of the other section, said head having a gasket seat at its bottom.

In testimony whereof I affix my signature in presence of two witnesses.

ALBERT A. HART.

Witnesses:
 A. DANIEL NOZIGLIA,
 SANDY D. GADBERRY.